(12) United States Patent
Ohno et al.

(10) Patent No.: US 6,507,557 B1
(45) Date of Patent: Jan. 14, 2003

(54) OPTICAL RECORDING MEDIUM AND RECORDING METHOD THEREFOR

(75) Inventors: Hirotoshi Ohno, Yokohama (JP); Fumitaka Tsuji, Zama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/527,850

(22) Filed: Mar. 17, 2000

(30) Foreign Application Priority Data

Mar. 25, 1999 (JP) .......................................... 11-081268

(51) Int. Cl.[7] ................................................ G11B 7/00
(52) U.S. Cl. .................. 369/275.3; 369/103; 369/275.4
(58) Field of Search ....................... 369/14, 103, 275.1, 369/275.3, 275.4, 274

(56) References Cited

U.S. PATENT DOCUMENTS

| | | | | |
|---|---|---|---|---|
| 5,138,604 A | * | 8/1992 | Umeda et al. | 369/103 |
| 5,615,205 A | * | 3/1997 | Belser | 369/275.3 |
| 5,675,570 A | * | 10/1997 | Ohira et al. | 369/275.1 |
| 5,748,607 A | * | 5/1998 | Ohira et al. | 369/274 |
| 5,751,671 A | * | 5/1998 | Koike et al. | 369/14 |
| 6,226,109 B1 | * | 5/2001 | Tompkin et al. | 369/103 |

FOREIGN PATENT DOCUMENTS

| | | |
|---|---|---|
| JP | 58-100235 | 6/1983 |
| JP | 61-123026 | 6/1986 |
| JP | 7-130134 | 5/1995 |
| JP | 8-83440 | 3/1996 |
| JP | 8-212560 | 8/1996 |
| JP | 8-273201 | 10/1996 |
| JP | 9-115186 | 5/1997 |
| JP | 9-128809 | 5/1997 |
| JP | 10-31825 | 2/1998 |

* cited by examiner

Primary Examiner—Thang V. Tran
Assistant Examiner—Bach Vuong
(74) Attorney, Agent, or Firm—Connolly Bove Lodge & Hutz LLP

(57) ABSTRACT

The pattern (104) of a desired character or design can be displayed visibly in an information recording area of an optical recording medium by utilizing the interference phenomenon of the reflected light (200a, 200b), which is caused by the different track pitch (P2, P3) from the standard track pitch (P1), wherein the different track pitch (P2, P3) is applied to some part of tracks (103) corresponding to the desired pattern (104) to be displayed visibly.

6 Claims, 7 Drawing Sheets

OPTICAL RECORDING MEDIUM AND RECORDING METHOD THEREFOR

BACKGROUND OF THE INVENTION

1. Field of the Invention

The present invention relates to an optical recording medium such as an optical disc recorded with information signals and a recording method therefor, particularly, relates to an optical recording medium of which a track is formed in a main information recording area on a disc shaped substrate, wherein the track is formed in concentric circles or in a spiral composed of array of a plurality of pits, and wherein tracks adjoining to each other are arranged approximately in a same pitch.

2. Description of the Related Art

With respect to contents of information recorded in an optical recording medium such as an optical disc, there provided prior arts related to express or indicate visibly numbers or characters such as alphabet indicating a recognition number or a manufacturing sequence number, which is inherent to the optical recording medium itself, and related to display visibly a design pattern corresponding to a content of information recorded. Actually, various methods or systems have been realized.

In order to prevent information signals such as music, video image or game software recorded in an optical disc from illegal duplication by illegal operation or reverse engineering, there provided prior arts disclosing a recording method, which records information of verifying that the optical disc is a genuine optical disc or a legally manufactured optical disc, wherein the verifying information is recorded as information by a visible character or symbol or pattern, or as information, which can be read out as data by utilizing pits allocated on a track. Actually, various systems or methods of preventing information signals from illegal duplication have been utilized.

The prior art, for example, Japanese Patent Laid-open Publication No. 58-100235/1983, which is filed by the same applicant as that of the present invention, discloses that numbers or characters such as alphabet indicating a recognition number or a manufacturing sequence number inherent to an optical disc itself and patterns related to a content of recorded information are recorded outside an information recording area, which is an area for recording information originally to be recorded such as music or video images, wherein such numbers, characters or patterns are visibly displayed or indicated by a dot pattern, which is formed a same pit structure as a pit recorded with information originally to be recorded as mentioned above.

The other Japanese Patent Laid-open Publications such as No. 9-128809/1997, No. 8-83440/1996 and 9-115186/1997 provide methods of forming an inherent pattern outside an information recording area of an optical disc. According to these methods, characters and patters can be displayed or indicated visibly in a main information recording area of an optical disc. Further, it is advantageous to an optical disc that characters or patterns can be formed on the disc during the same manufacturing process of recording information such as music or video images originally and can be displayed or indicated.

However, in all these methods, an exclusive pattern for indicating characters or designs is formed by exclusive pits for displaying the characters or the designs, wherein the exclusive pits are a different format from pits for information to be recorded originally. Accordingly, such exclusive pattern for indicating characters or designs can be displayed only in a narrow area such as a blank space outside an information recording area for recording information to be recorded originally. In other words, there exist a problem that it is basically impossible to indicate characters or designs at an arbitrary location in an information recording area of an optical disc and in arbitrary dimensions.

On the other hand, Japanese Patent Laid-open Publications No. 7-130134/1995 and No. 8-273201/1996 provide a method of forming a pattern for visible characters or designs in an information recording area as well as outside an information recording area.

The Japanese Patent Laid-open Publication No. 7-130134/1995 discloses that a pattern for visible characters or designs are formed with pits in an information recording area of an optical disc in conjunction with information to be recorded originally by writing the information to be recorded originally and the pattern for characters or designs in the CAV (Constant Angular Velocity) and CLV (Constant Linear Velocity) systems respectively. According to the disclosure, a pattern for characters or designs is formed with a pit of the CLV system on an optical disc, wherein information such as music and video images are originally recorded with a pit of the CAV system. Accordingly, a pattern for visible characters or designs can be displayed in an information recording area of an optical disc in conjunction with recording information to be recorded originally.

Forming information to be recorded originally and a pattern for indicating characters or designs in one recording area by writing them with the CAV and CLV systems respectively is assigning some of pits, which are originally provided for recording information to be recorded, to the pattern for indicating characters or designs. In other words, some pits out of a total capacity of pits provided for the information to be recorded in the recording area are utilized for forming the pattern for indicating characters or designs. Accordingly, recording capacity for the information to be recorded originally in the recording area is sacrificed for the pits assigned to the pattern for indicating characters or designs.

Since a pattern for indicating characters or designs can be formed in one recording area together with information to be recorded originally by these prior arts, it is possible to display the pattern for indicating characters or designs at an arbitrary location and in arbitrary dimensions. However, there exists a problem that recording capacity for the information to be recorded originally is decreased by recording capacity for the pattern for indicating characters or designs. The problem is rather serious problem for an optical disc, which is recently required to increase its recording capacity. In other words, the prior arts mentioned above can not comply with such a requirement that information to be recorded originally such as music, video images and application software shall be recorded as much as possible in an optical recording medium like an optical disc. It is disadvantageous to the prior arts.

The other prior art related to forming a visible pattern of characters or designs in a recording area is disclosed in the Japanese Patent Laid-open Publication No. 8-273201/1996. According to the disclosure, in a dual disc such as a DVD (Digital Versatile Disc), which is a disc having a structure of sticking two transparent substrates together, a pattern for indicating characters or designs is displayed in a main information recording area of the dual disc by interposing the pattern for indicating characters or designs printed, for example, in between the two transparent substrates.

However, this prior art can not be applied to an optical disc having only one transparent substrate, that is, an optical disc having single layer of transparent substrate, because the art is applied only to an optical disc having dual layers of transparent substrate.

Japanese Patent Laid-open Publications No. 8-212560/1996 and No. 61-123026/1986 provide another method of writing information for identifying an optical disc whether it is a genuine or fake as a symbol or cipher on a data array or signal not as a visible pattern. Such symbol or cipher can be identified as data and further the information for identification can be protected from duplicating illegally by the method. Therefore, it is possible to identify whether the optical disc is a genuine or fake more accurately and also it prevents an optical disc from illegal duplication, and the illegally duplicated optical disc can be securely identified.

If the art is practiced, however, it causes a problem that an exclusive apparatus for writing and reading out data for identifying an optical disc whether a genuine or fake must be furnished. Further, there exists another problem that the optical disc can not be identified whether it is a genuine or fake at a glance unless the apparatus is utilized. In addition thereto, it is essentially impossible to display characters or designs visibly.

As mentioned above, the prior art, which displays a visible pattern of characters or designs by utilizing a regular pit for recording information, has an advantage of being able to obtain the visible pattern through a simple manufacturing process because the visible pattern for displaying characters or designs can be formed by utilizing a same pit as that for recording original information. However, an area in where such a visible pattern can be displayed is limited to a narrow area outside the original information recording area such as an outermost circumference area or an innermost area of an optical disc, that is, an extra space area. In addition thereto, only characters or designs in small dimensions can be displayed in the narrow area.

In the case of the prior art of displaying a visible pattern such as character and design in the original information recording area, since some pits in the information recording area are diverted to the visible pattern, the pits are no more utilized for recording original information. Accordingly, recording capacity for recording information to be recorded originally is decreased and it causes a problem of being against a recent market demand for increasing information recording capacity much more.

Pits for recording original information together with pits diverted to the visible pattern are mixed in the information recording area of an optical disc, it is necessary for a reproducing apparatus to discriminate two types of pits one by one when the optical disc is loaded into the apparatus and the original information is read out. The apparatus must be equipped with a function of discriminating types of pits rapidly and accurately one by one, otherwise the pits diverted to the visible pattern may be read out as noise or irregular data. Accordingly, it causes problems that the recorded information can not be reproduced accurately and that the original information can be reproduced as music, video images or application software including many noise or irregular data.

In the case of utilizing the visible pattern mentioned above as an identification symbol for preventing an optical disc from illegal duplication, since recorded contents of the disc and the visible pattern can easily be reproduced by a regular reproducing apparatus if the visible pattern is formed by the same forming system as that of general pit. Such the identification symbol is actually not effective to prevent the optical disc from or to find illegal duplication or reverse engineering. Accordingly, it is necessary to form an identification symbol for preventing an optical disc from illegal duplication by the other forming method or system.

There existed another problem that a sophisticated apparatus exclusively for writing or reading out identification data must be prepared although the prior art of writing or reading out an invisible symbol or cipher as an identification symbol or identification data for preventing an optical disc from illegal duplication is provided. It is impossible to confirm an optical disc whether it is a genuine disc or faked at a glance, unless such the apparatus is utilized. In addition thereto, it is essentially impossible to display characters or designs visibly, because they are recorded invisibly as data.

SUMMARY OF THE INVENTION

Accordingly, an object of the present invention is to provide an optical recording medium, which solves problems in the prior arts mentioned above.

In order to achieve the above object, the present invention provides an optical recording medium such as an optical disc, which can display a visible pattern such as characters or designs at an arbitrary location in a main information recording area on a substrate of the optical recording medium and can maintain original recording capacity sufficiently without loosing any recording capacity for information to be recorded originally although means for displaying a visible pattern are provided in the information recording area. Further, the optical recording medium is equipped with means for displaying the visible pattern such as characters or designs, which can be apparently identified visually at a glance and utilized as an identification pattern being not able to be duplicated illegally.

According to an aspect of the present invention, there provided an optical recording medium comprising tracks, which are arranged in concentric circles or a spiral on a disc and composed of plural pits, wherein a track pitch between adjoining tracks is formed approximately equal to each other, the optical recording medium is recorded with an information signal by means of the plural pits, the optical recording medium is further characterized by that the track pitch is displaced to a radial direction of the disc in response to a desired pattern of character and/or design, and that the desired pattern is displayed visibly at least in a recording area for the information signal of the disc by an interference of a reflected light caused by a displaced track pitch, wherein the interference caused by the displaced track pitch is different from other interference of a reflected light caused by a track pitch not displaced.

According to another aspect of the present invention, there provided a recording method of an optical recording medium having tracks, which are arranged in concentric circles or a spiral on a disc and composed of plural pits, wherein a track pitch between adjoining tracks is formed approximately equal to each other, said optical recording medium is recorded with an information signal by means of said plural pits, the recording method further comprises a step of displacing the track pitch to a radial direction of the disc in response to a desired pattern of character and/or design and a step of displaying the desired pattern visibly at least in a recording area for the information signal on the disc by an interference of a reflected light caused by a displaced track pitch, wherein the interference caused by the displaced track pitch is different from other interference of a reflected light caused by a track pitch not displaced.

Other object and further features of the present invention will be apparent from the following detailed description when read in conjunction with the accompanying drawings.

DETAILED DESCRIPTION OF THE PREFERRED EMBODIMENTS

Embodiment

Figure 1:
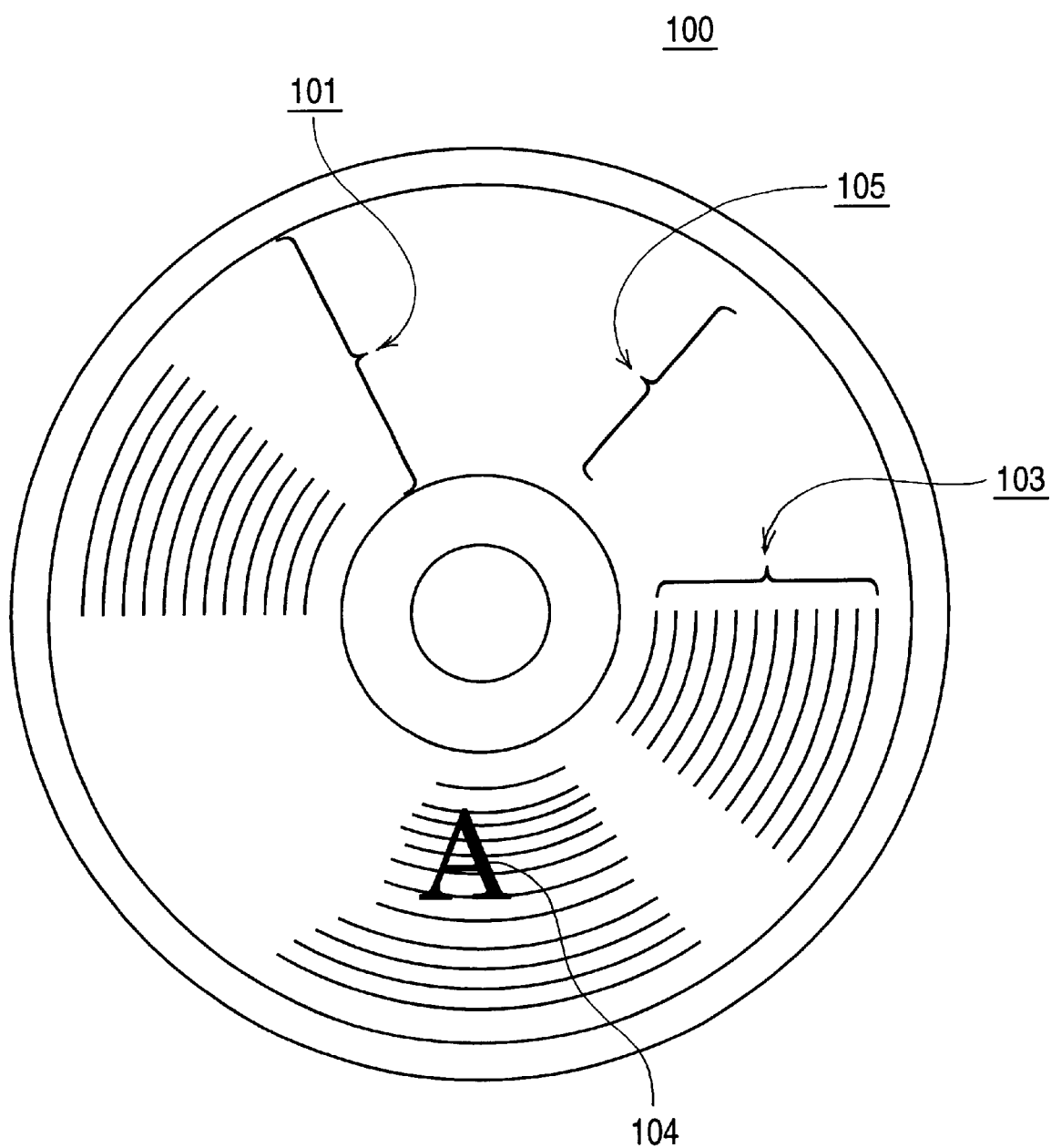
FIG. 1 shows an outline of an optical recording medium according to an embodiment of the present invention.
Figure 2A:
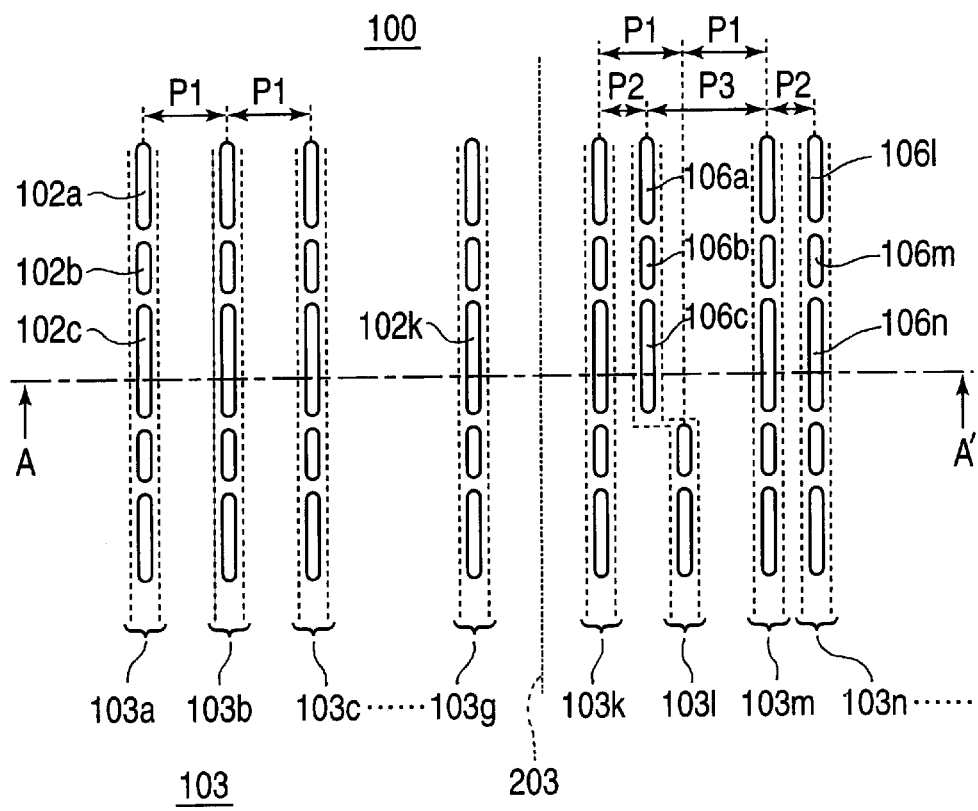
FIG. 2(a) is a plan view of an optical recording medium showing an arrangement of tracks composed of a plurality of pits, which display a visible pattern such as characters or designs by changing a track pitch on a flat substrate of the optical recording medium according to the embodiment of the present invention.
Figure 2B:
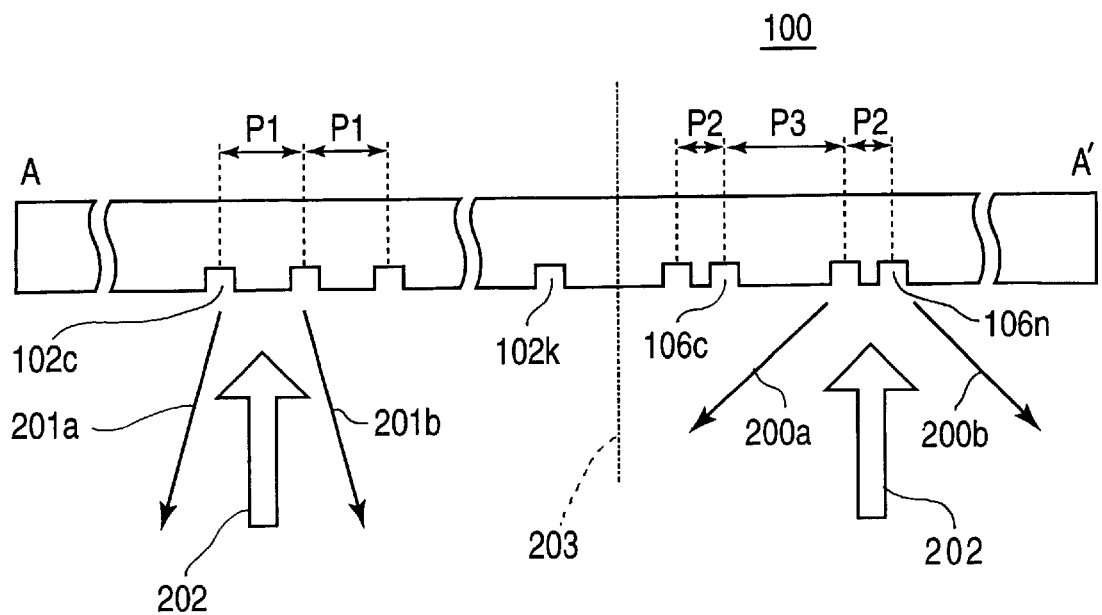
FIG. 2(b) is a sectional view taken substantially along line A–A' of FIG. 2(a).

FIG. 1 shows an outline of an optical recording medium according to an embodiment of the present invention. In FIG. 1, an optical recording medium comprises a disc shaped substrate 100 having a main information recording area 101 composed of a recording area 105 for recording information signals, which is formed with a track 103 spirally or in concentric circles. The track 103 is composed of a plurality of pits in series and adjoining tracks are arranged approximately in an equal pitch, that is, in a track pitch of P1. A desired visible pattern 104 is displayed on the recording area 105 in the main information recording area 101. FIG. 2(a) is a enlarged plan view of a plurality of tracks 103a through 103n, hereinafter called tracks 103 in general, which are allocated in the recording area 105 shown in FIG. 1. The tracks 103 are arranged with plural pits 102a through 102n, hereinafter called pits 102 in general. These plural pits 102 record information signals such as video images, music and application software with respective pit length and its allocation in the longitudinal direction of a track. Some tracks arranged with pits 106a through 106n, hereinafter called pits 106 in general, which are corresponding to the desired visible pattern 104 shown in FIG. 1 as a character pattern "A", are allocated in the recording area 105 by displacing their pitches from P1 to P2 or P3 in the radial direction of the disc shaped substrate 100. A boundary 203 exists in between an area of allocating all tracks 103 by the same track pitch of P1 and another area of allocating pits 106 by different track pitch of P2 or P3. FIG. 2(b) is a sectional view taken substantially along line A—A' of FIG. 2(a). In FIG. 2(b), an incident light 202 irradiates the tracks 103 composed of the pits 102 and 106 allocated in the recording area 105 of the disc shaped substrate 100 and reflected by the pits 102 and 106. Reflected light 200a and 200b, hereinafter called reflected light 200, by the tracks composed of the pits 106 having a displaced track pitch of P2 or P3 and reflected light 201a and 201b, hereinafter called reflected light 201, by the tracks composed of pits 102 having a standard track pitch of P1 are interfered respectively. Since interference caused by the reflected light 200, which is reflected by the displaced track pitch of P2 or P3, is intentionally designed to be different from interference by the reflected light 201 reflected by the standard track pitch of P1, the desired visible pattern 104 can be displayed visibly on the recording area 105 in the main information recording area 101 of the disc shaped substrate 100.

In a disc shaped optical recording medium such as an optical disc, generally, it is demanded that information shall be recorded in high density as much as possible. In order to increase recording density, a width (Pt) of a track 103, which is composed of an array of a plurality of pits 102, is formed extremely in minute. Further, a gap, that is, a track pitch (P1) between adjoining tracks 103 is arranged at regular intervals in a predetermined pitch of P1 so as to eliminate irregularity such as cross talk generated in between adjoining tracks while reading out recorded data or signals. This structure of an optical recording medium, that is, the minute track width (Pt) and the track pitch (P1) act as a diffraction grating as if the diffraction grating is composed of a plurality of minute slits. Accordingly, an angular area of the reflected light 201, which is bright in an inherent direction, is generated by diffraction and interference effects of light prescribed by a wave length of the incident light 202 and an interval of slits, that is, the track pitch (P1).

Such the diffraction and interference caused by the reflected light 201 and generating a bright area in an inherent direction are generally classified as the Fraunhofer diffraction and interference by combining the track width (Pt) and the track pitch (P1), which are basically employed in an optical disc such as a regular CD (Compact Disc), with a wave length of visible light commonly available in regular living environment. As a result of the Fraunhofer diffraction and interference, rainbow like light reflection, which can be seen on an information recording area of a regular CD, occurs.

According to the aspect of the present invention, an angle of a bright area generated by diffraction and interference of the reflected light 200 and 201 can be controlled by shifting a track to the outermost circumference direction or to the innermost circumference direction so as to change a track pitch from P1 to P2 or P3 as shown in FIGS. 2(a) and 2(b). In other words, in the recording area 105 composed of a plurality of pits 102 and 106 in an optical recording medium, an angle of a bright area generated by the reflected light 200 can be controlled to be completely different angle from that of generated by the reflected light 201.

Accordingly, a line or a plain of a pattern for displaying character or design can be displayed in an area of generating the reflected light 200 by the tracks composed of pits 106 of which a track pitch is displaced from P1 to P2 or P3. The area of generating the reflected light 200 is separated from the area of generating the reflected light 201 is outlined by the boundary 203. Further, while displacing the track pitch from P1 to P2 or P3, an amount of variance, that is, ΔP=P1–P2 is assigned within a limited range not so as to be discriminated as abnormal tracking by a regular reproducing apparatus. With respect to readout of originally recorded information recorded in pits having the track pitch of P2 or P3, a regular reproducing or reading out apparatus can read out the originally recorded information without any difference from reading out regular pits having the track pitch of P1 and can certainly read out without any inconvenience.

In this embodiment of the present invention, the amount of variance ΔP is defined as minutely as less than 100 nm. Since the amount of variance is assigned to a minute value, tracks shifted are not judged by a reproducing apparatus that tracking is irregular when the reproducing apparatus reads out recorded data from the tracks shifted. Further, a character patter can be fully displayed visually.

Figure 3:
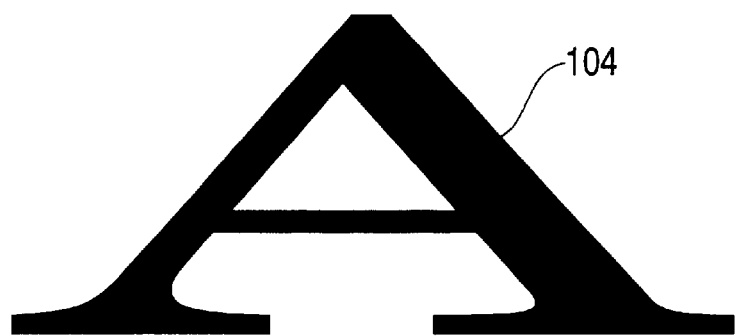
FIG. 3 shows an example of a desired character pattern, which is displayed visibly on an optical recording medium, according to the embodiment of the present invention.
Figure 4:
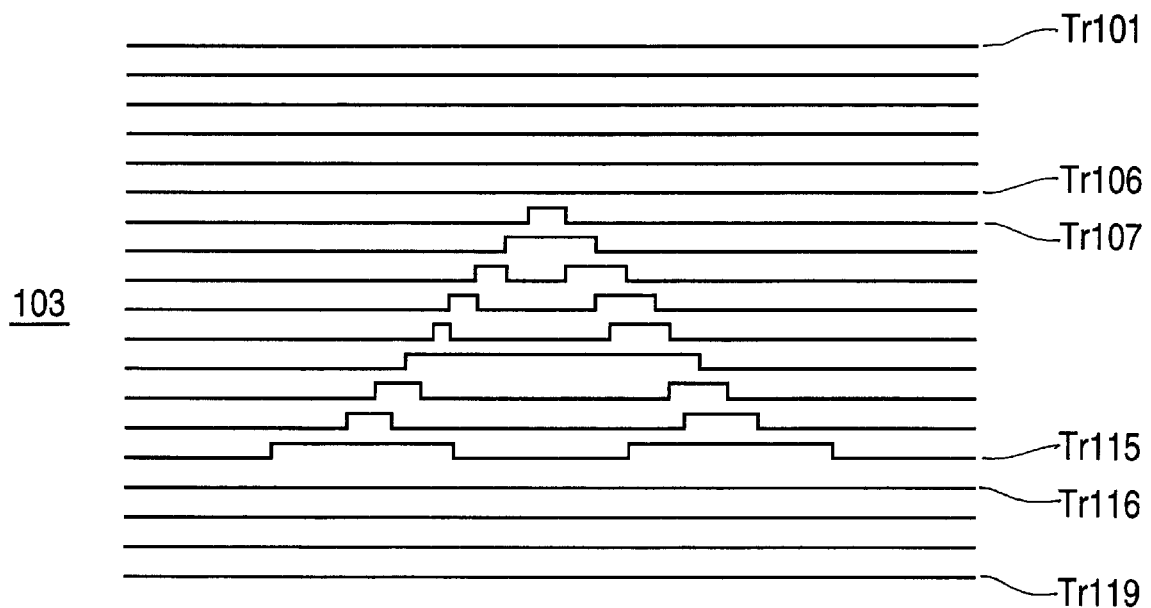
FIG. 4 shows an exemplary model of a first method of changing a track pitch in order to display the desired visible pattern shown in FIG. 3.

FIG. 3 shows an example of a desired character pattern, which shall be displayed visibly on an optical disc as shown in FIG. 1 according to the embodiment of the present invention. FIG. 4 shows an exemplary model of displaying the desired character pattern shown in FIG. 3 visibly according to a first method of changing a track pitch. In FIG. 4, the tracks 103 are composed of 19 tracks Tr101 through Tr119 and the drawing shows typically that the desired character patter is displayed by using 9 tracks Tr107 through Tr115. However, a number of tracks 103, which is necessary to displaying one visible patter, is actually a larger number of tracks than that of shown in FIG. 4, that is, some thousands to some ten thousands tracks 103 are necessary to displaying the visible pattern.

As shown in FIG. 4, a pitch of the tracks 103 (Tr107 through Tr115) corresponding to the visible pattern to be displayed is displaced toward the innermost circumference in the radial direction of the optical disc by the variance ΔP mentioned above so as to become P2. The displacement (ΔP) is formed that all tracks corresponding to the visible pattern are displaced toward the innermost circumference in the radial direction and not displaced toward the outermost circumference at all. It is also feasible as well that the variance ΔP of the track pitch is displaced toward the outermost circumference in the radial direction of an optical disc, not shown though, in contrast with the case shown in FIG. 4.

Accordingly, by changing a track pitch in response to a visible pattern to be displayed, the visible pattern shown in FIG. 3, particularly, an outline of the visible pattern can be actually displayed by utilizing variations of diffraction and interference of reflected light caused by variance of the track pitch as shown in FIG. 2(b).

Figure 5:
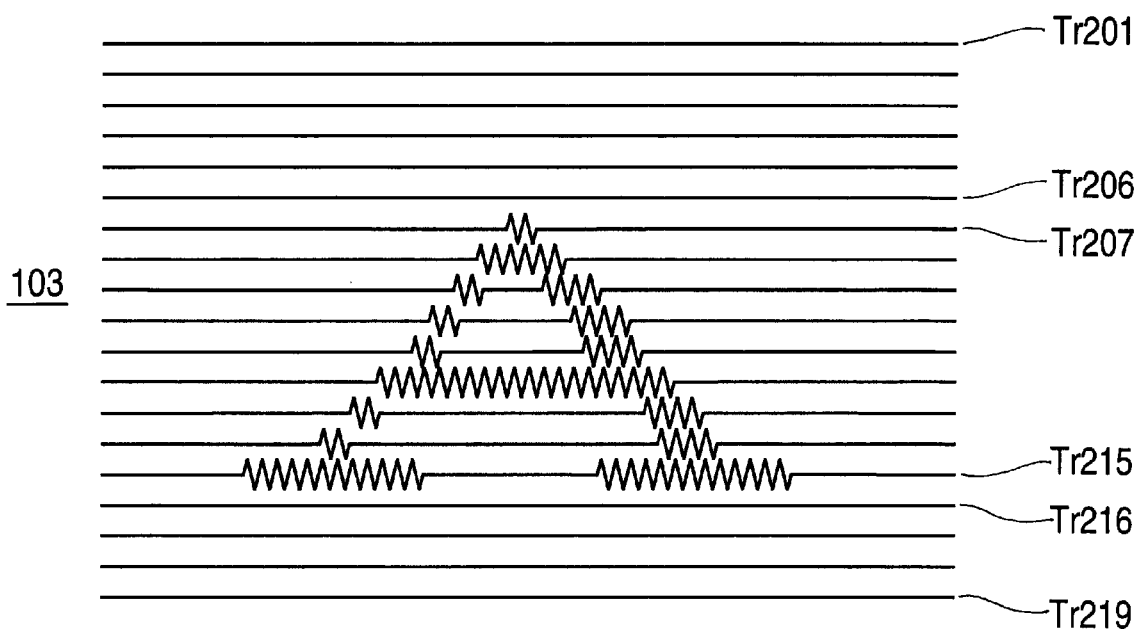
FIG. 5 shows an exemplary model of a second method of changing a track pitch in order to display the desired visible pattern shown in FIG. 3.

FIG. 5 shows an exemplary model of displaying the desired character pattern shown in FIG. 3 according to a second method of changing a track pitch. In FIG. 5, the tracks 103 comprise 19 tracks Tr201 through Tr219.

As shown in FIG. 5, a direction of displacement of the tracks Tr207 through Tr215, which are corresponding to a desired visible pattern shown in FIG. 3, are shifted so as to swing alternately toward both directions of innermost and outermost circumferences in the radial direction of the main information recording area 101 of a disc on a basis of tracks Tr201 through Tr206 and Tr216 through Tr219, which are not shifted. The tracks corresponding to the desired visible pattern are formed as a line having a sinusoidal wave. Accordingly, the desired visible pattern is displayed visibly as a total pattern including a plain configuration such as bold typeface of the pattern as well as its outline by forming the tracks corresponding to the desired visible pattern as a sinusoidal waveform.

In addition thereto, a servo characteristic of a reproducing apparatus, which tracks a track pattern of a regular sinusoidal waveform mentioned above, is maintained stable when an optical disc is loaded and a recorded content of the optical disc is read out and reproduced.

Figure 6:
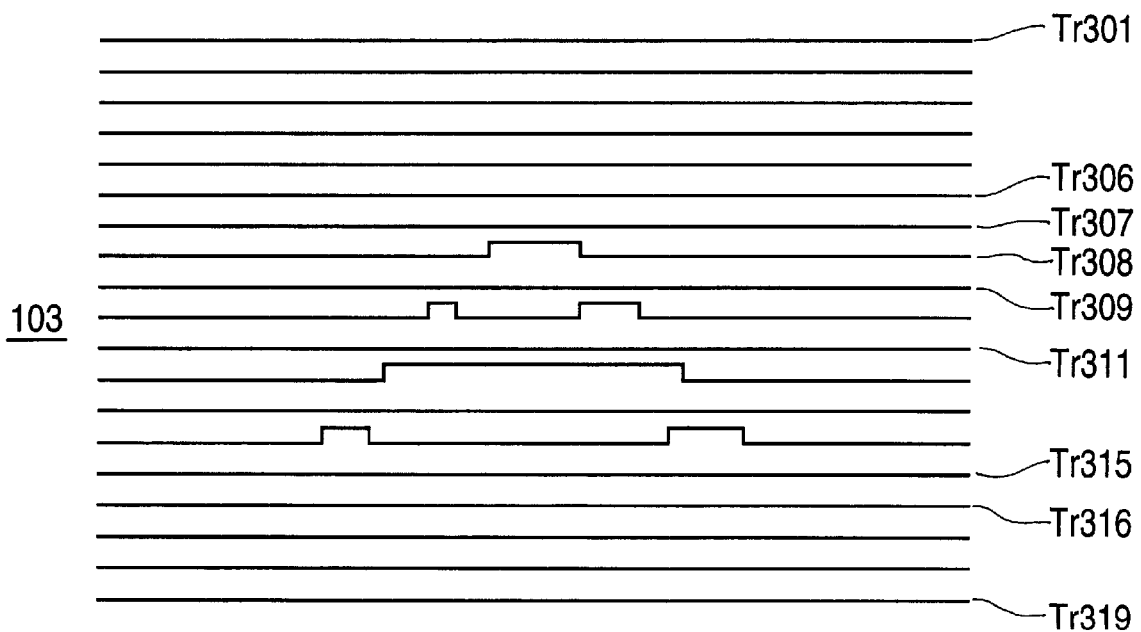
FIG. 6 shows an exemplary model of a third method of changing a track pitch in order to display the desired visible pattern shown in FIG. 3.

FIG. 6 shows an exemplary model of displaying the desired visible character pattern shown in FIG. 3 according to a third method of changing a track pitch. In FIG. 6, the tracks 103 are composed of 19 tracks Tr301 through Tr319. The tracks Tr307 through Tr315 are corresponding to the visible pattern 104. However, a part of displacement corresponding to the visible pattern 104 is not included in the track Tr309 although the track Tr309 is one component track of comprising the visible pattern 104. Such tracks as Tr309 and Tr311, which are not displaced, are intentionally mixed in the tracks corresponding to the visible pattern 104. As shown in FIG. 6, odd numbered tracks such as Tr307, Tr309 and Tr311 are kept in the standard track pitch P1 and not displaced at all. On the other hand, the even numbered tracks such as Tr308, Tr310 and Tr312 are displaced at a part corresponding to the visible pattern 104. In other words, tracks displaced in response to the visible pattern 104 are allocated at every other track in all the tracks 103. This method is particularly effective in displaying a long pattern, which is longer to the radial direction of an optical disc.

In addition thereto, a track being displaced at a part corresponding to the visible pattern 104 is not limited to every other track as mentioned above. The track being displaced can be allocated at every third track or more. If the track being displaced is allocated at intervals of excessively many tracks, visibility of the desired pattern may be deteriorated because effect of diffraction and interference of reflected light caused by the track being displaced is weakened. It is desirable to eliminate this deterioration of visibility. Accordingly, allocating a track being displaced at every other track is most preferable to obtain most effective diffraction and interference of reflected light caused by the track being displaced.

Figure 7:
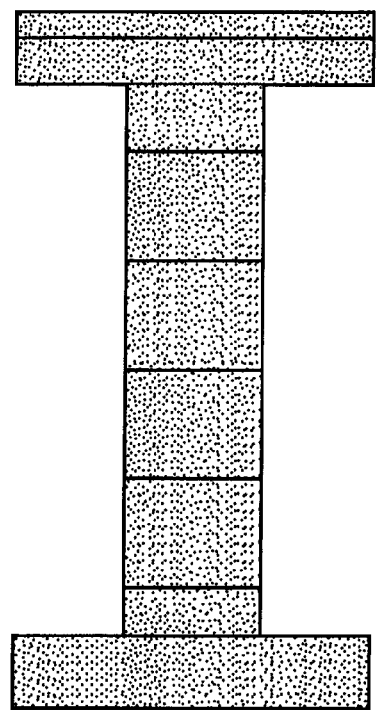
FIG. 7 shows an I-shaped pattern as an example of a long pattern extended along a radial direction of an optical disc.
Figure 8:
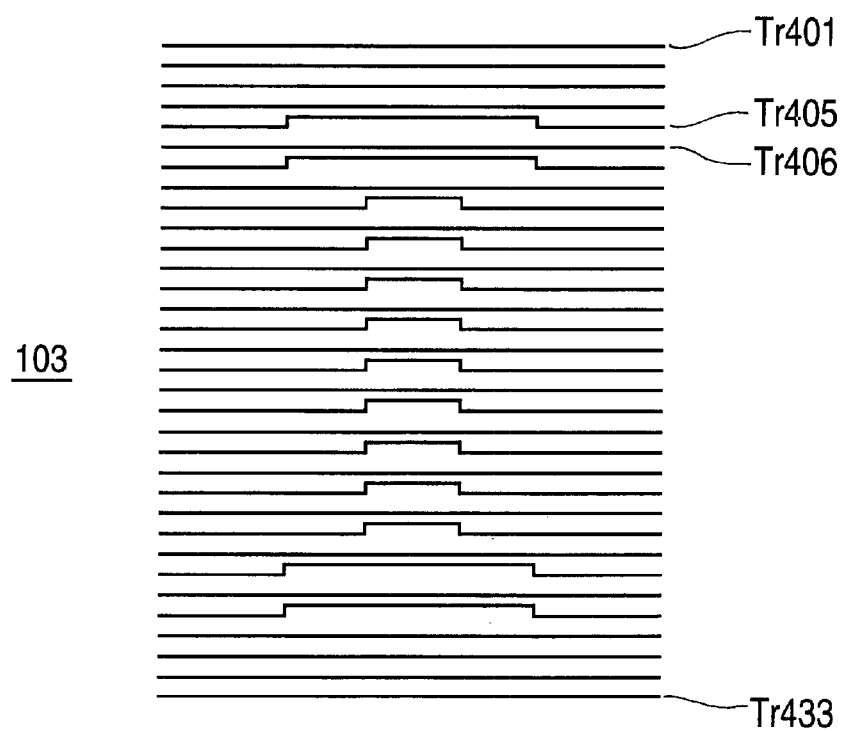
FIG. 8 shows an example of utilizing the third method shown in FIG. 6 in order to display the I-shaped pattern shown in FIG. 7.
Figure 9:
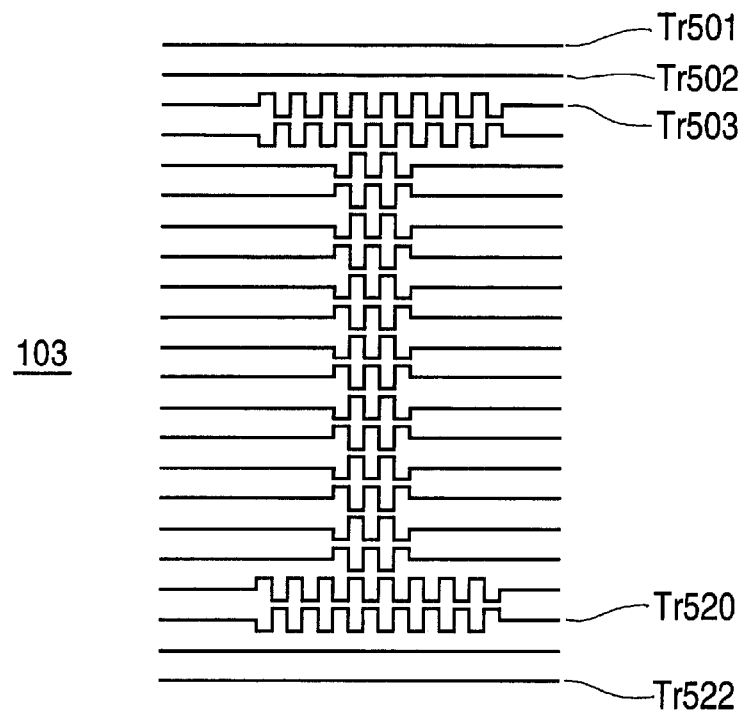
FIG. 9 shows an example of a fourth method of forming a track corresponding to a visible pattern into a square waveform like shape in the double current system, wherein an amplitude of the square waveform like shape alternately changes to an outermost circumference and an innermost circumference in a radial direction of an optical disc on a basis of a track of being not changed.
Figure 10:
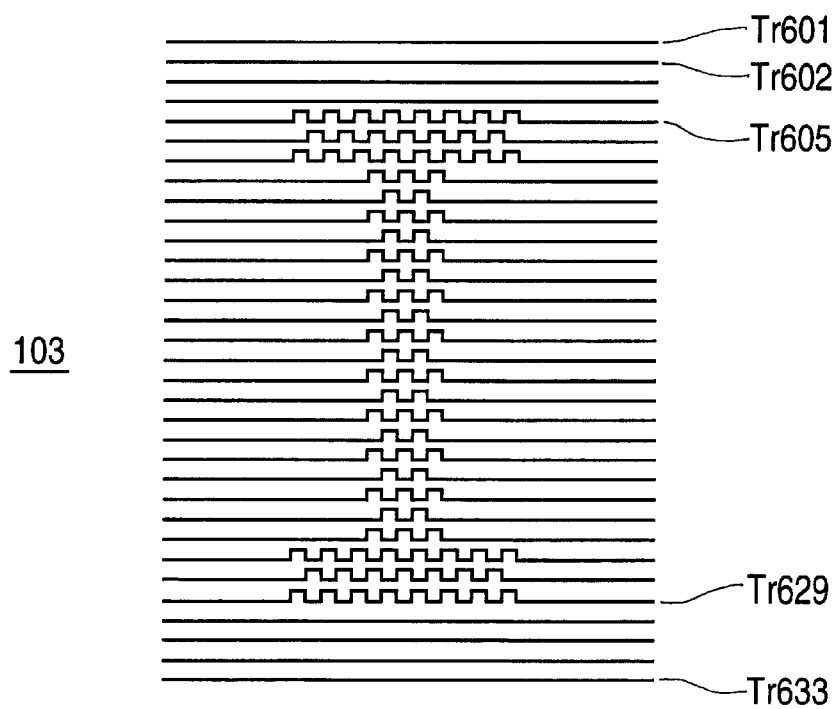
FIG. 10 shows an example of a fifth method of forming a track corresponding to a visible pattern into a square waveform like shape in the single current system, wherein an amplitude of the square waveform like shape changes only to an outermost circumference in the radial direction of an optical disc on a basis of a track of being not changed.

FIG. 7 shows an I-shaped pattern as an example of a long pattern extended along a radial direction of an optical disc. FIGS. 8 through 10 show exemplary models of displaying the I-shaped pattern shown in FIG. 7 so as to display the I-shaped pattern visibly as a total pattern including a plain configuration such as bold typeface of the pattern as well as its outline in accordance with further methods of the present invention.

FIG. 8 shows an example of displaying the I-shaped pattern shown in FIG. 7 by using effectively the third method mentioned above with referring FIG. 6. In FIG. 8, the tracks 103 are composed of 33 tracks Tr401 through Tr433 and some tracks allocated at every other track such as Tr406 are not displaced although they are basically corresponding to the I-shaped pattern shown in FIG. 7. In a case that the first method shown in FIG. 4 is applied to a longer shaped pattern toward the radial direction of an optical disc, that is, the longer shaped pattern is longer to a direction of intersecting perpendicularly to the tracks 103 as shown in FIG. 7, an outline of the longer shaped pattern can be fully displayed. However, it is actually hard to display the I-shaped pattern visibly as a total pattern including a plain configuration such as bold typeface of the pattern. On the other hand, by applying the third method of allocating a track of which a track pitch is displaced from the standard track pitch P1 at every other track as shown in FIG. 8, such the longer pattern to the direction of intersecting perpendicularly to the tracks 103 can fully be displayed visibly as a total pattern including a plain configuration such as bold typeface of the pattern. In addition thereto, it is also feasible that adjoining tracks are displaced toward directions opposite to each other although not shown in a drawing, for example, an even numbered track is displaced toward the outermost circumference direction and an odd numbered track is displaced to the innermost circumference direction.

FIG. 9 shows an example of displaying the longer pattern shown in FIG. 7 according to a fourth method of the present invention. In FIG. 9, the tracks 103 are composed of 22 tracks Tr501 through Tr522 and the tracks Tr503 through Tr520 are corresponding to the visible pattern shown in FIG. 7. It is also feasible that the tracks Tr503 through Tr520 are formed as a rectangular waveform, which is displaced so as to swing alternately toward both the outermost and the innermost circumference directions in the radial direction of an optical disc as shown in FIG. 9 on a basis of a track not to be displaced such as Tr501 or Tr502. The desired visible pattern can be displayed visibly as a total pattern including a plain configuration such as bold typeface of the pattern as well as its outline by forming the tracks corresponding to the desired visible pattern as mentioned above.

FIG. 10 shows an example of displaying the longer pattern shown in FIG. 7 according to a fifth method of the present invention. In FIG. 10, the tracks 103 are composed of 33 tracks Tr601 through Tr633 and the tracks Tr605 through Tr629 are corresponding to the visible pattern shown in FIG. 7. As shown in FIG. 10, the tracks Tr605 through Tr629 corresponding to the visible pattern are displaced only toward the outermost circumference direction in the radial direction of an optical disc so as to form a rectangular waveform on a basis of other tracks not displaced such as Tr602. In other words, the tracks corresponding to the visible pattern are formed as a line having a rectangular waveform of half-wave pulsation. Accordingly, the desired visible pattern can be displayed visibly as a total pattern including a plain configuration such as bold typeface of the pattern as well as its outline by forming the tracks corresponding to the desired visible pattern as mentioned above. In addition thereto, it is also feasible that the tracks corresponding to the desired visible pattern are displaced toward the innermost circumference direction in the radial direction of an optical disc in contrast to the tracks shown in FIG. 10 although not shown in a drawing.

In order to manufacture an optical recording medium, in which a track pitch is displaced in response to a desired visible pattern, a master disc in which a track pitch is displaced corresponding to the desired visible pattern must be produced first. A working disc, that is, an optical disc by mass production is manufactured by utilizing the master disc. Accordingly, a configuration of a recording apparatus for producing a master disc and its operation are depicted thereinafter.

Figure 11:
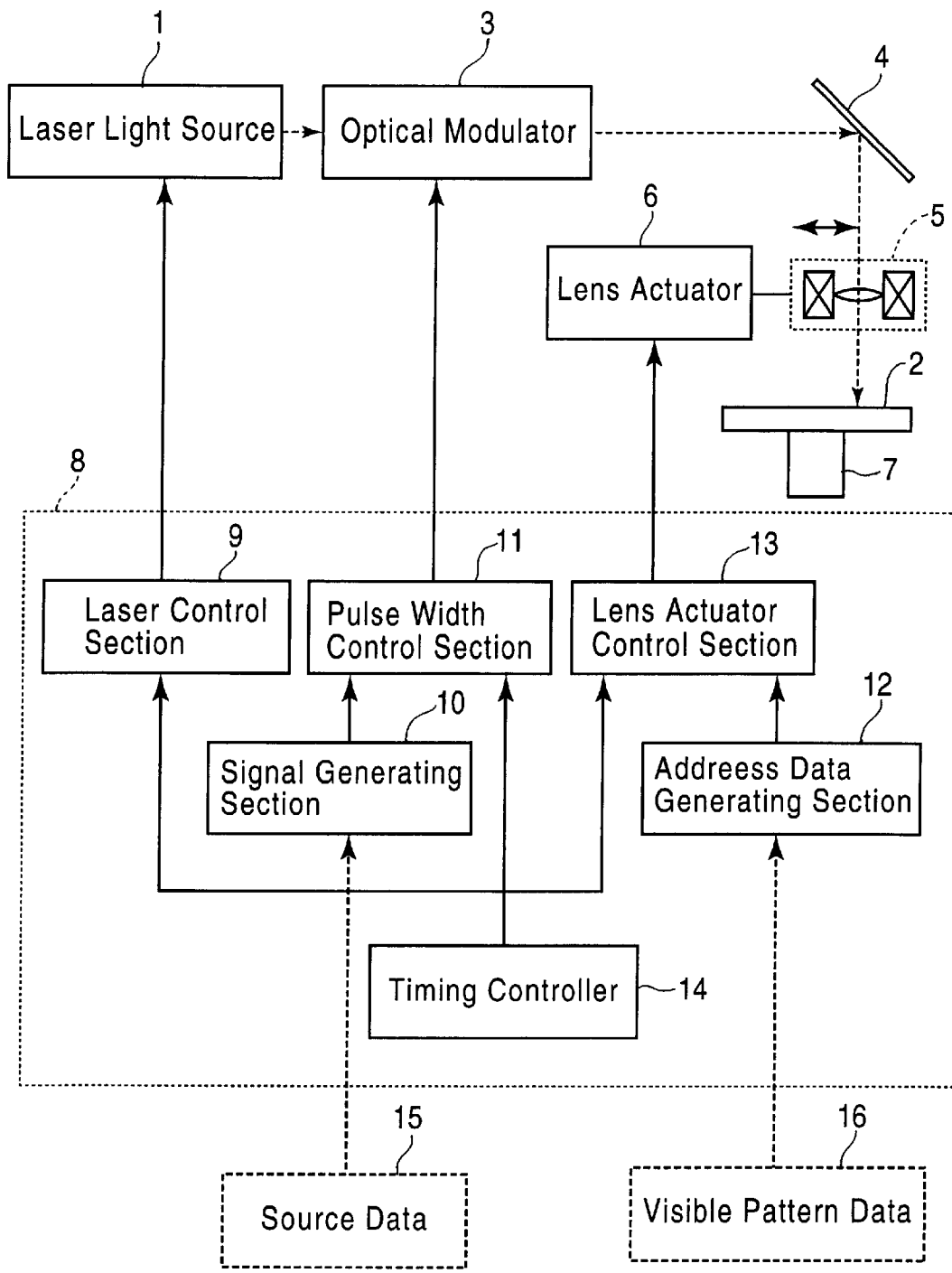
FIG. 11 shows a block diagram of a recording apparatus for producing a master disc for mass-producing an optical recording medium according to the present invention, particularly shows an outline of a method of changing a track pitch in response to a desired visible pattern.

FIG. 11 shows a block diagram of a recording apparatus for producing a master disc for mass-producing an optical recording medium according to the present invention. The recording apparatus comprises a laser light source 1 for recording, a master disc 2, an optical modulator 3, a mirror 4, a lens system 5, a lens actuator 6 for tracking, a motor 7 and a recording circuit 8. The recording circuit 8 further comprises a laser control section 9, a signal generating section 10 for recording pit, a pulse width control section 11, an address data generating section 12 of pitch changing position, a control section 13 for lens actuator and a timing controller 14. In addition thereto, a source data 15 of recording information and a visible pattern data 16 are supplied to the signal generator 10 and the address data generating section 12 respectively. In FIG. 11, the laser light source 1 generates laser beam for engraving pits on the master disc 2. The optical modulator 3 modulates a pulse width of the laser beam radiated from the laser light source 1. The laser beam modulated by the optical modulator 3 is reflected by the mirror 4 and transmitted to the lens system 5. The lens system 5 is moved from the innermost circumference to the outermost circumference in the radial direction of the master disc 2 in conjunction with the mirror 4 by the lens actuator 6. The motor 7 rotates the master disc 2. The laser control section 9 controls the laser light source 1 to generate laser beam. The signal generating section 10 generates a signal for recording a pit based upon the source data 15 of information to be recorded such as music or video image, which is supplied from the outside of the recording circuit 8. The pulse width control section 11 controls the optical modulator 3 in accordance with a signal generated by the signal generator 10. The address data generating section 12 converts the visible pattern data 16 to a track pitch address in the polar coordinates system, for instance. The timing controller 14 controls operation timing of the laser control section 9, the pulse width control section 11 and the lens actuator control section 13 so as to activate them in synchronism with each other. Further, the motor 7 is a spindle motor controlled by a rotation control circuit, not shown, and rotates the master disc 2 at a certain number of rotation corresponding to a position of the lens system 5. In other words, the number of rotation of the motor 7 is in response to a position of the lens system 5 and in synchronism with a movement of the position of the lens system 5, which is controlled by the lens actuator control section 13.

In the configuration of the recording apparatus mentioned above, particularly, the lens actuator 6 is controlled by the address data generating section 12 and the lens actuator control section 13 and drives the lens system 5, so that the lens system 5 always moves in a predetermined standard track pitch such as 1.6 $\mu$m, for example, as the regular specification as long as the track pitch is not displaced. Further, the lens system 5 engraves pits for recording information, although not shown in FIG. 11, on a flat substrate of the master disc 2 by using the laser beam irradiated from the laser light source 1 through the optical modulator 3 in synchronism with the movement of the lens system 5. The lens actuator control section 13 displaces a track pitch from the standard track pitch (P1) by a predetermined amount of variance $\Delta P$ in accordance with an address data of pitch change generated by the address data generating section 12 while a pit corresponding to an address designated by the address data of pitch change is engraved. In addition thereto, if the source data 15 is not necessary to coincide exactly with the visible pattern data 16, for example, in a case that a pattern can be allocated at any position in the radial direction of the master disc, a timing pulse generated once a rotation of the motor 7 can be utilized as a substitute of the address data generating section 12.

Accordingly, a track pitch of an area corresponding to a visible character or pattern can be formed in a different pitch from the standard pitch (P1) in other areas than the area corresponding to the visible character or pattern.

While the invention has been described above with reference to specific embodiment and method thereof, it is apparent that many changes, modifications and variations in the arrangement of equipment and devices can be made without departing from the invention concept disclosed herein. For example, a predetermined amount of variant can be obtained by deflecting an optical axis of a laser beam itself with inserting an optical deflection device such as $TeO_2$ into the succeeding stage of the optical modulator 9 shown in FIG. 11.

The matrix coordinates system can also be utilized for a coordinates system of an address data so as to change a track pitch although the polar coordinates system is disclosed in the embodiment of the present invention. Nevertheless, the polar coordinates system is much easier to handle location information, that is, address data on a flat substrate of a disc shaped recording medium such as an optical disc generally, because more simplified operation method and data processing method can be applied to the polar coordinates system in comparison with the matrix coordinates system.

With respect to the configuration of the recording apparatus for producing a master disc, various kinds of configurations other than the one disclosed above can be applicable. It is common to all configurations that address data of positions at where a track is displaced in response to a visible pattern to be displayed are produced and a lens system for irradiating a laser beam on a master disc is shifted in the radial direction of the master disc in accordance with the address data so as to displace a track pitch of a track defined by the address data by an amount of variance ΔP in synchronism with engraving a pit for recording information at the track defined by the address data. In a case of forming a track composed of a array of pits mechanically with a cutting process by using a cutting device, a method of changing a track pitch of a concerned track is also required as mentioned above.

According to the aspect of the present invention, a desired pattern is displayed visibly on an optical disc by means of reflected light of the optical disc. However, transmission light through an optical disc can also be utilized for displaying a desired pattern as other aspect of the present invention. Further, the present invention mentioned above in the embodiment is applied to a disc shaped optical recording medium such as an optical disc provided with a track, which is allocated in concentric circles or spirally and composed of a plurality of pits, as one example. Nevertheless, the present invention can also be applied to other recording medium having an external form of a rectangular shape other than a disc shape such as an optical card as long as it is provided with linear tracks, which are allocated in a regular pitch.

According to another aspect of the present invention, there provided an optical recording medium, which can display a visible pattern such as a character or design on the optical recording medium, particularly, in an information recording area of the optical recording medium. Further, there provided an optical recording medium, which can fully maintain an original recording capacity without losing any recording capacity for information to be basically recorded in an information recording area although means for displaying a visible pattern is provided in the information recording area. In addition thereto, there provided an optical recording medium, which can display a visible pattern such as a character or design, wherein the visible pattern is an identification pattern of being identified visibly at a glance anytime, wherein an original recording capacity of an information recording area can be fully maintained even though the visible pattern is displayed in the information recording area, and wherein the visible pattern can be utilized for an identification pattern, which can not be duplicated illegally.

What is claimed is:

1. An optical recording medium having tracks, which are arranged in concentric circles or a spiral on a disc and composed of plural pits, wherein a track pitch between adjoining tracks is formed approximately equal to each other, said optical recording medium is recorded with an information signal by means of said plural pits, said optical recording medium is further characterized by that said track pitch is displaced to a radial direction of said disc in response to a desired pattern of character and/or design, and that said desired pattern is displayed visibly at least in a recording area for said information signal on said disc by an interference of a reflected light caused by a displaced, track pitch, wherein said interference caused by said displaced track pitch is different from other interference of a reflected light caused by a track pitch not displaced.

2. The optical recording medium in accordance with claim 1, in order to realize displacement of said track pitch, said optical recording medium is further characterized by that a direction of displacement of a track to be displaced is designated to one direction out of outermost circumference and innermost circumference directions in the radial direction of said disc on a basis of the track pitch between adjoining tracks not displaced.

3. The optical recording medium in accordance with claim 1, in order to realize displacement of said track pitch, said optical recording medium is further characterized by that a direction of displacement of a track to be displaced is designated to both directions so as to swing alternately toward outermost circumference and innermost circumference directions in the radial direction of said disc on a basis of the track pitch between adjoining tracks not displaced.

4. A recording method of an optical recording medium having tracks, which are arranged in concentric circles or a spiral on a disc and composed of plural pits, wherein a track pitch between adjoining tracks is formed-approximately equal to each other, said optical recording medium is recorded with an information signal by means of said plural pits, said recording method further comprises steps of:

displacing said track pitch to a radial direction of said disc in response to a desired pattern of character and/or design; and displaying said desired pattern visibly at least in a recording area for said information signal on said disc by an interference of a reflected light caused, by a displaced track pitch, wherein said interference caused by said displaced track pitch is different from other interference of a reflected light caused by a track pitch not displaced.

5. The recording method of an optical recording medium in accordance with claim 4, in order to realize displacement of said track pitch, said recording method is further characterized by that a direction of displacement of a track to be displaced is designated to one direction out of outermost circumference and innermost circumference directions in the radial direction of said disc on a basis of the track pitch between adjoining tracks not displaced.

6. The recording method of an optical recording medium in accordance with claim 4, in order to realize displacement of said track pitch, said recording method is further characterized by that a direction of displacement of a track to be displaced is designated to both directions so as to swing alternately toward outermost circumference and innermost circumference directions in the radial direction of said disc on a basis of the track pitch between adjoining tracks not displaced.

* * * * *